April 16, 1935.   C. W. MABLEY   1,997,594

STENCIL SHEET

Filed March 23, 1934

INVENTOR
Clarence W. Mabley
BY Robert W Byerly
ATTORNEY

Patented Apr. 16, 1935

1,997,594

UNITED STATES PATENT OFFICE 1,997,594

STENCIL-SHEET

Clarence W. Mabley, Chicago, Ill., assignor to A. B. Dick Company, Chicago, Ill., a corporation of Illinois Application March 23, 1934, Serial No. 717,034

9 Claims. (Cl. 41—38.5)

This invention relates to stencil-sheets, and provides a stencil-sheet of great strength which is capable of reproducing both fine lines and large black areas. The invention is of especial value in connection with photographic stencils, but its utility is not limited to such stencils.

The stencil-sheets now in use consist essentially of a layer of removable material, parts of which may be removed to provide stencil openings, and which, for brevity, I term "the stencil layer", and an open or porous base sheet embedded in the stencil layer and serving to hold in position the portions of the stencil layer which are not removed in stencilizing. The strength of such a stencil depends, to a large extent, on the strength of the fibres of the base sheet, while its ability to reproduce fine lines is dependent upon the fineness of these fibres. Only to the extent to which fibres may be, at the same time, both strong and fine has it been possible, in such stencil-sheets, to combine the qualities of strength and fine reproduction.

By my invention, I have succeeded in obtaining a stencil-sheet the great strength which is important in the printing of large black areas, and, at the same time, the ability to reproduce fine lines. This I have accomplished by providing a stencil-sheet in which the stencil layer is supported by two open base sheets wholly or partially embedded therein. One of the base sheets has relatively large, strong fibres separated by relatively large open spaces, while the other base sheet has fine fibres separated by small spaces. One of the base sheets may have its fibres crossing at right angles so that they do not tend to prevent distortion of the sheet, provided that the fibres of the other base sheet cross at acute angles to provide a triangular structure which prevents distortion. The stencil layer serves to secure the two base sheets together and to prevent the passage of ink through the openings in both of them. In stencilizing the sheet, portions of the stencil layer are removed to leave through openings across which the exposed fibres of both base sheets extend at slightly different levels.

Great strength is particularly important for photographic stencils because of the manipulation to which they must be subjected in the developing process. My invention is, therefore, of special value when applied to photographic stencils, and, in order that its nature may clearly be understood, I will describe in detail a photographic stencil embodying the invention which is illustrated in the accompanying drawing, in which.

Figure 1:
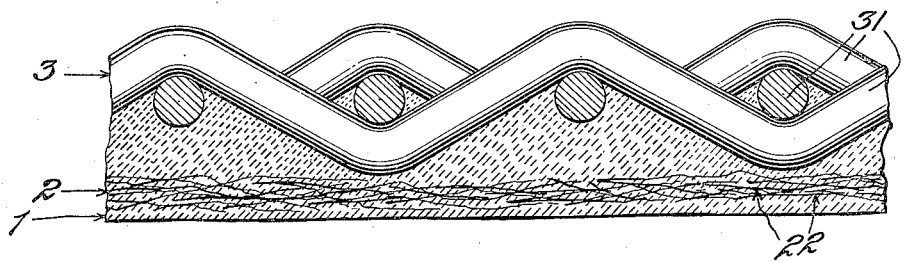
Fig. 1 is a greatly enlarged cross-sectional view of the stencil-sheet.
Figure 2:
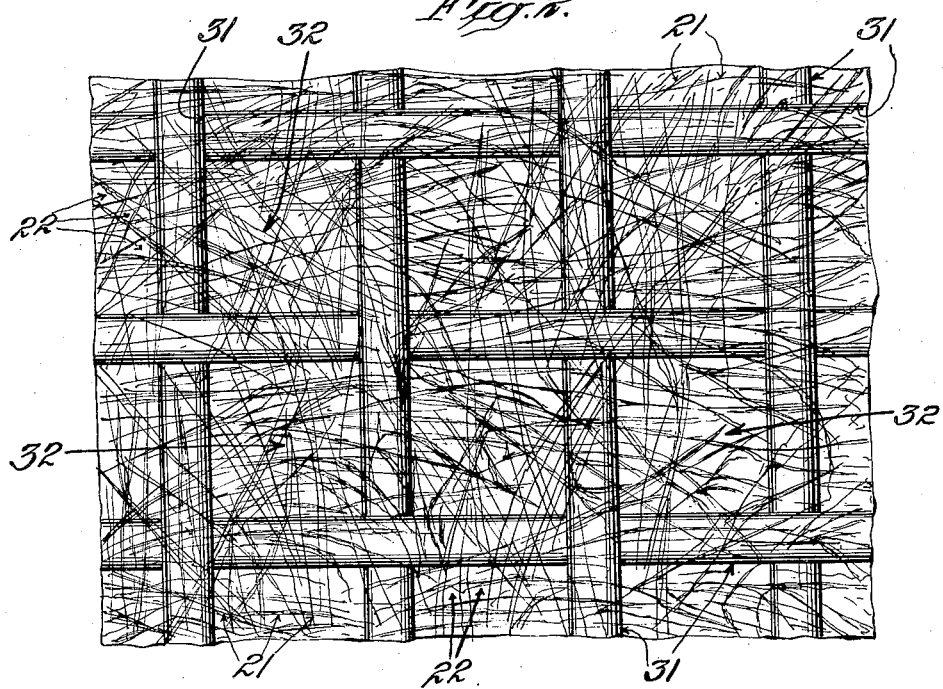
Fig. 2 is an enlarged face view of a portion of the stencil-sheet.

The stencil-sheet shown in the drawing consists of a stencil layer 1 having embedded therein a fine-fibre open base sheet 2, and partially embedded therein a coarse-fibre base sheet 3. The fine-fibre base sheet 2 is a sheet of porous paper such as Yoshino having fine fibres 21 crossing each other at different acute angles and leaving minute open spaces 22 between. The coarse-fibre base sheet 3 consists of an open, woven fabric such as organdie, nainsook or bolting cloth, or similar material having strong fibres or threads 31 crossing each other at right angles and leaving rectangular open spaces 32 of substantial size.

The stencil layer 1 consists of a light-sensitive composition whose solubility is changed by exposure to light. It is immaterial, so far as the present invention is concerned, which of the many light-sensitive substances of this character be used. A satisfactory material is uncoagulated gelatin which is made light-sensitive by treatment with a solution of a bichromate immediately before the stencil-sheet is to be exposed to light for stencilizing it photographically.

The stencil which has been described may be made in the following manner:

The sheet of Yoshino paper 2 is impregnated with a gelatin solution containing some softening material, such as the solution described in Dick Patent No. 1,101,260 except that no dichromate or other tanning agent is included. The impregnated Yoshino sheet, while wet with water, is squeegeed onto a smooth metallic plate. The exposed surface of the sheet is brushed with a thin solution of the same gelatin composition as that with which the Yoshino sheet has been impregnated. The fabric sheet 3 is then placed on the exposed surface of the impregnated Yoshino sheet and lightly squeegeed into intimate contact therewith. The laminated, unitary stencil-sheet thus produced is allowed to dry on the metal plate and is then stripped from the metal plate. Just before the sheet is to be stencilized the gelatin is sensitized by floating the stencil-sheet on a 1 per cent. solution of ammonium or potassium bichromate and then drying it on a squeegee plate in the dark. Alternatively, the sensitizing solution may be applied to the stencil-sheet with a brush.

The sheet is stencilized by exposure to light through a diapositive of the matter to be reproduced. The portions of the stencil layer which are struck by the light are made insoluble in hot water.

The sheet is then developed by floating in a hot water bath, which dissolves out the unexposed parts of the stencil layer, leaving the exposed portions. During the development, tearing or rupture of the sheet is prevented by the strength of the threads of the fabric 3; distortion of the sheet is prevented by the fibres of the Yoshino paper 2 which cross at many different acute angles so as to form a triangular structure which is not distortable; and separation of the two base sheets is prevented by the light-struck, insoluble portions of the stencil layer.

In case the matter to be reproduced contains large black areas, the dissolving of the stencil material in these large areas tends to remove the Yoshino fibres in these areas, except for those at the edges of the areas which project into and are held by the insoluble portions of the stencil layer; but notwithstanding the removal of these fibres in the large soluble areas, the insoluble areas of the stencil layer are held in proper relation to each other by the threads of the fabric 3, which extend the entire length and width of the sheet and remain in places across the large areas where the stencil layer has been dissolved.

In printing from the stencilized stencil-sheet, the impression paper is placed in contact with the side of the stencil layer furthest from the fabric sheet, that is, the lower side as shown in Fig. 1, the ink is forced through the other side of the paper, and consequently reaches the paper through the portion of the stencil layer which is held by the fine fibres of the Yoshino paper in the fine openings in the stencil layer and around the edges of the large openings. The threads of the fabric 3 being at a distance from the surface in contact with the impression sheet do not produce white lines in the print, but allow the ink to strike the impression sheet over the entire surface of any large open areas in the stencil layer, as well as in all the fine lines or openings in the stencil layer. Both fine lines and large black spaces are, therefore, eractly reproduced.

While the stencil-sheet which has been described is most desirably stencilized photographically in the manner described, it may also be stencilized by the impact of the type of a typewriter. In such case the stencil layer is softened by the application of water or of a softening solution such as is described in Dick Patent No. 1,101,259 before the sheet is placed in the typewriter. A stencil-sheet intended primarily to be stencilized in a typewriter may be made in accordance with my invention by substituting for the specific stencil layer which has been described a stencil layer of a composition which remains type-impressible for a long period such as that of Hill Patent No. 1,526,982.

What I claim is:

1. A laminated unitary stencil-sheet having a stencil layer supported by two superposed porous base sheets having coarse and fine fibres respectively.

2. A laminated unitary stencil-sheet having a stencil layer supported by superposed porous base sheets having relatively large and relatively small openings respectively.

3. A laminated unitary stencil-sheet having a stencil layer supported by two superposed porous base sheets, one of which has fibres crossing at right angles, and the other of which has fibres crossing at acute angles to form a triangular structure.

4. A laminated unitary stencil-sheet having a stencil layer supported by two superposed porous base sheets, one of which consists of open, woven fabric, and the other of porous paper.

5. A laminated unitary stencil-sheet, comprising a stencil layer, a fine-fibre sheet embedded in the stencil layer, and a coarse-fibre sheet partially embedded in the stencil layer at one surface thereof.

6. A laminated unitary stencil-sheet, comprising a stencil layer, a sheet of porous paper embedded in the stencil layer, and a sheet of open, woven fabric partially embedded in the stencil layer at one surface thereof.

7. A photographic stencil-sheet, comprising superposed sheets of open fabric and porous paper, and a layer of light-sensitizable composition holding said sheets together and obstructing the openings in them.

8. A photographic stencil-sheet, comprising a layer of a composition whose solubility is changed by exposure to light and superposed sheets of porous paper and open fabric strengthening said layer and held together thereby.

9. A photographic stencil, comprising superposed sheets of Yoshino paper and open, woven fabric and a composition whose solubility is changed by exposure to light impregnating the Yoshino sheet and securing it to the fabric sheet.

CLARENCE W. MABLEY.